(12) United States Patent
Holsberry (10) Patent No.: US 9,241,039 B2
(45) Date of Patent: Jan. 19, 2016

(54) AUTOMATED TRACKING OF CLASS ATTENDANCE

(75) Inventor: Richard T. Holsberry, Granville, WV (US)

(73) Assignee: WEST VIRGINIA UNIVERSITY, Morgantown, WV (US)

( * ) Notice: Subject to any disclaimer, the term of this patent is extended or adjusted under 35 U.S.C. 154(b) by 3052 days.

(21) Appl. No.: 11/456,734

(22) Filed: Jul. 11, 2006

(65) Prior Publication Data

US 2008/0040502 A1 Feb. 14, 2008

(51) Int. Cl.
| | |
|---|---|
| G06Q 10/00 | (2012.01) |
| G06Q 30/00 | (2012.01) |
| C12N 5/07 | (2010.01) |
| G08B 13/14 | (2006.01) |
| H04L 29/08 | (2006.01) |
| G06K 19/077 | (2006.01) |
| G06Q 10/08 | (2012.01) |
| G09B 7/02 | (2006.01) |
| G06Q 50/20 | (2012.01) |

(52) U.S. Cl.
CPC .......... *H04L 67/24* (2013.01); *G06K 19/07749* (2013.01); *G06Q 10/087* (2013.01); *G06Q 10/0833* (2013.01); *G06Q 50/20* (2013.01); *G09B 7/02* (2013.01)

(58) Field of Classification Search
None
See application file for complete search history.

(56) References Cited

U.S. PATENT DOCUMENTS

| | | | | |
|---|---|---|---|---|
| 7,336,185 | B2 * | 2/2008 | Turner et al. | 340/572.8 |
| 2005/0233294 | A1 * | 10/2005 | Keitch | 434/350 |
| 2008/0238687 | A1 * | 10/2008 | Ozer et al. | 340/572.7 |

OTHER PUBLICATIONS

Declaration of Richard T. Holsberry, executed Jun. 13, 2008.

* cited by examiner

*Primary Examiner* — Ryan Zeender
*Assistant Examiner* — Denisse Ortiz Roman
(74) *Attorney, Agent, or Firm* — Thomas | Horstemeyer, LLP (57) ABSTRACT

Various systems, methods, and programs embodied on computer readable mediums are provided relating to classroom attendance tracking. In one embodiment, a method is provided that comprises the steps of harvesting personal identification data from each one of a plurality of students attending a class in conjunction with a conduct of the class using a portable identification capture device, and coupling the portable identification capture device to a client coupled to a server via a network. The method further comprises automatically uploading the personal identification data from the portable identification capture device to the server.

20 Claims, 5 Drawing Sheets

AUTOMATED TRACKING OF CLASS ATTENDANCE

BACKGROUND

In universities and other institutions, classes are conducted and grades are awarded to students based upon performance on tests, quizzes and the like. In addition, another factor that is often taken into account is the attendance of students to classes associated with a given academic course. Unfortunately, where class sizes are relatively large, the task of taking attendance at the beginning of a class can be burdensome. This is because it is usually a manual process that requires the attention of the professor for a period of time during a class session, thereby reducing the amount of time that a professor can teach the subject matter of the course. Also, sometimes professors can forget to take attendance, resulting in unreliable attendance data that might have to be disregarded when determining grades for students.

SUMMARY

The present invention provides various embodiments for the tracking of classroom attendance. In one embodiment, among others, a method is provided for classroom attendance tracking. The method comprises the step of harvesting personal identification data from each one of a plurality of students attending a class in conjunction with a conduct of the class using a portable identification capture device. The method also comprises the steps of coupling the portable identification capture device to a client coupled to a server via a network, and automatically uploading the personal identification data from the portable identification capture device to the server.

In another embodiment, a system is provided that comprises a processor circuit in a client, the processor circuit having a processor and a memory. Stored in the memory and executable by the processor is an automated upload system. The automated upload system comprises logic that detects a coupling of a portable identification capture device to the client, wherein personal identification data captured from each one of a plurality of students attending a class is stored on the portable identification capture device, the personal identification data having been captured in the portable identification capture device in conjunction with a conduct of the class. The automated upload system further comprises logic that automatically uploads the personal identification data from the portable identification capture device to a server that is coupled to the client through a network.

In still another embodiment, a system in a client is provided for uploading data to a server from a portable identification capture device. In this respect, the system comprises means for detecting a coupling of the portable identification capture device to the client, wherein personal identification data captured from each one of a plurality of students attending a class is stored on the portable identification capture device, the personal identification data having been captured in the portable identification capture device in conjunction with a conduct of the class. The system also comprises means for automatically uploading the personal identification data from the portable identification capture device to a server that is coupled to the client through a network.

In yet an additional embodiment, a computer program embodied in a computer readable medium is provided for execution in a client to upload data to a server from a portable identification capture device. In this respect, the computer program comprises code that detects a coupling of the portable identification capture device to the client, wherein personal identification data captured from each one of a plurality of students attending a class is stored on the portable identification capture device, the personal identification data having been captured in the portable identification capture device in conjunction with a conduct of the class. The computer program further comprises code that automatically uploads the personal identification data from the portable identification capture device to a server that is coupled to the client through a network.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
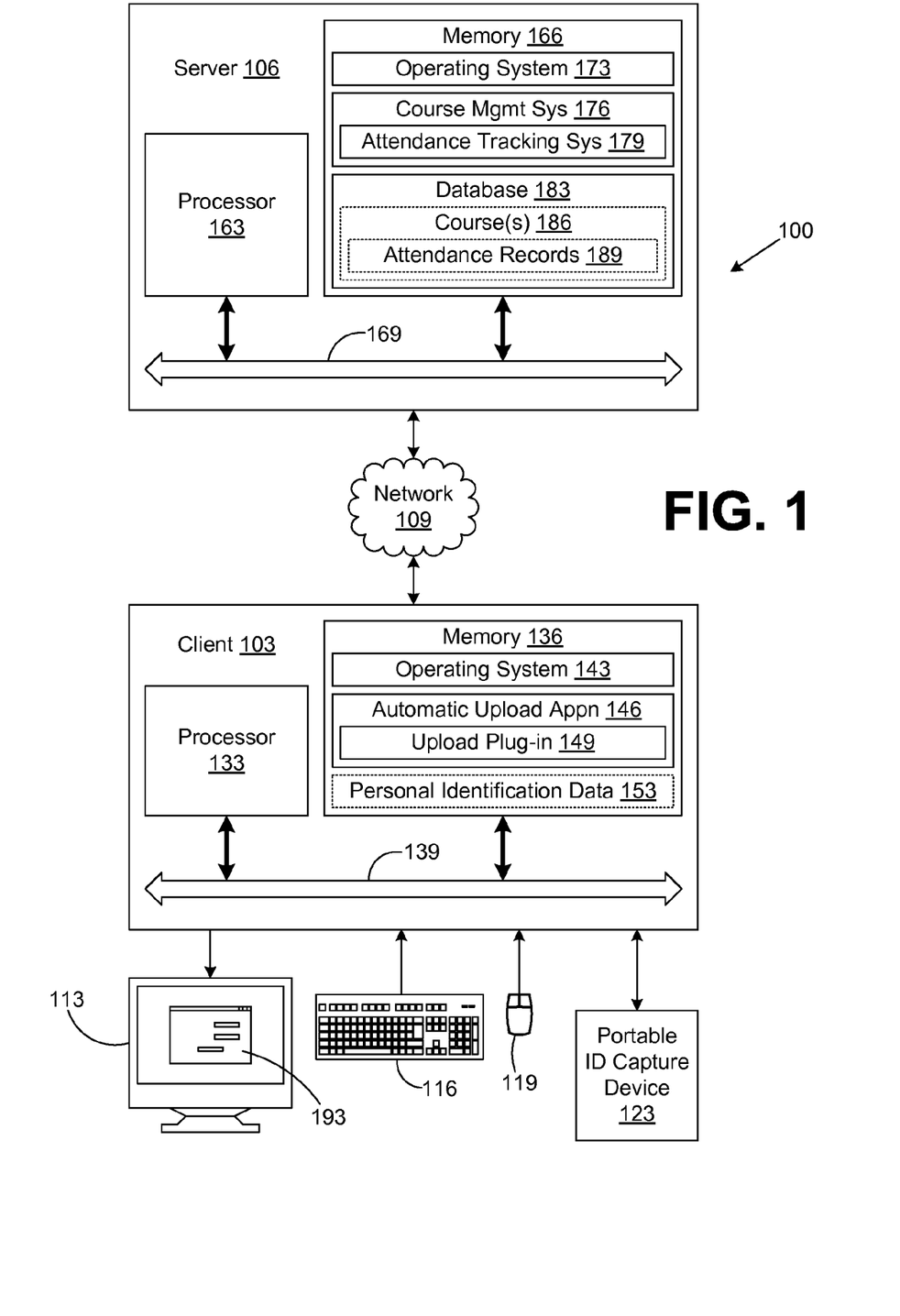
FIG. 1 is a schematic block diagram of a network that facilitates tracking of class attendance according to an embodiment of the present invention.

With reference to FIG. 1, shown is an attendance tracking network 100 according to an embodiment of the present invention. The attendance tracking network 100 includes, for example, a client 103 and a server 106. The client 103 is coupled to the server 106 through a network 109. In this respect, the network 109 may comprise, for example, the Internet, a local area network, a wide area network, or any other type of network as can be appreciated.

The client 103 comprises, for example, a computer system such as a laptop, desktop, or other type of computer system as can be appreciated. In this respect, the client 103 includes a display device 113, a keyboard 116, and a mouse 119. In addition, the client 103 may include other peripheral devices such as, for example, a keypad, touch pad, touch screen, microphone, scanner, joystick, or one or more push buttons, etc. The peripheral devices may also include indicator lights, speakers, printers, etc. The display device 113 may be, for example, cathode ray tubes (CRTs), liquid crystal display screens, gas plasma-based flat panel displays, or other types of display devices, etc.

From time to time, a portable identification capture device 123 is coupled to the client 103 in order to facilitate the upload of attendance data as will be described. In this respect, the portable identification capture device 123 may be coupled to the client 103 using a suitable underface such as, for example, a serial interface, a universal serial bus (USB), a parallel interface, wireless interface, or any other appropriate interface facilitating communication between the portable identification capture device 123 and the client 103. The portable identification capture device 123 is employed to capture and temporarily store personal identification data 153 of students in a class as proof that the student was in attendance at the time the personal identification data 153 was entered. In this respect, the portable identification capture device 123 may comprise any device that inputs appropriate personal identification data 153 from the students such as, for example, a magnetic stripe reader, a radio frequency identification device (RFID), a biometric data reading device, or another device. In one example, the portable identification capture device 123 may comprise, for example, any one of a number of magnetic stripe readers that are currently commercially available from various manufacturers.

In this respect, the personal identification data entered by students into the portable ID capture device 123 may comprise, for example, data stored on a magnetic card such as a student ID, data from a finger print, data from a retinal scan, data embedded in an RFID tag, or other personal identification data. The personal identification data thus comprises values that correspond to each of the students. Each of the values uniquely identifies the students relative to each other and, by virtue that a value for a given student was captured in the portable identification capture device 123, provides proof that the respective student was personally present at a given class to effect the capture of the value in the portable identification capture device 123.

The client 103 includes a processor circuit having a processor 133 and a memory 136, both of which are coupled to a local interface 139. The local interface 139 may comprise, for example, a data bus with an accompanying control/address bus as can be appreciated by those with ordinary skill in the art. In this respect, the client 103 may comprise a computer system or other device with like capability. Stored in the memory 136 and executable by the processor 133 are an operating system 143, and an automatic upload application 146. A portion of the automatic upload application 146 may comprise an upload plug-in 149. In addition, during an execution of the automatic upload application 146, it may be the case that personal identification data 153 is temporarily stored in memory 136 during the upload operation as will be described.

The server 106 may comprise, for example, a computer system having a processor circuit as can be appreciated by those with ordinary skill in the art. In this respect, the server 106 includes the processor circuit having a processor 163 and a memory 166, both of which are coupled to a local underface 169. The local interface 169 may comprise, for example, a data bus with an accompanying control/address bus as can be appreciated. The server 106 is employed to store and track attendance of students, for example, to classes of a course based upon data that is uploaded by the client 103 from the portable identification capture device 123.

To facilitate such a function, the server 106 includes several components that are stored under memory 166 and are executable by the processor 163. Such components may include an operating system 173 and a course management system 176. In one embodiment, an attendance tracking system 179 is included as a portion of the course management system 176. In an alternative embodiment, the attendance tracking system 179 may be independent of the course management system 176, and, the course management system 176 may not actually exist in the memory 166 at all.

In addition, a database 183 is stored in the memory 166. The database 183 includes data about courses 186. Each of the attendance records 189 includes personal identification data captured in each of the classes of each course 186 from the students taking the course 186. Each course 186 may be identified both by subject matter in association with a particular instructor or professor. By virtue of including the personal identification data captured from the students in the classes, the attendance records 189 include data that acts as proof that the students attended the various classes of the courses 186 as the personal identification data was captured from the students before or during each of the classes of a given course 186.

A number of software components are stored in the memories 136 and 166 and are executable by the processors 133 and 163. In this respect, the term "executable" means a program file that is in a form that can ultimately be run by the processors 133 and 163. Examples of executable programs may be, for example, a compiled program that can be translated into machine code in a format that can be loaded into a random access portion of the memories 136 and 166 and run by the processors 133 and 163, or source code that may be expressed in proper format such as object code that is capable of being loaded into a of random access portion of the memories 136 and 166 and executed by the processors 133 and 163, etc. An executable program may be stored in any portion or component of the memories 136 and 166 including, for example, random access memory, read-only memory, a hard drive, compact disk (CD), floppy disk, or other memory components.

In this respect, the memories 136 and 166 are defined herein as both volatile and nonvolatile memory and data storage components. Volatile components are those that do not retain data values upon loss of power. Nonvolatile components are those that retain data upon a loss of power. Thus, each of the memories 136 and 166 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each of the processors 133 and 163 may represent multiple processors and each of the memories 136 and 166 may represent multiple memories that operate in parallel processing circuits, respectively. In such a case, each of the local interfaces 139 and 169 may be an appropriate network that facilitates communication between any two of the multiple processors, between any processor and any of the memories, or between any two of the memories, etc. The processors 133 and 163 may be of electrical, optical, or molecular construction, or of some other construction as can be appreciated by those with ordinary skill in the art.

The operating systems 143 and 173 are executed to control the allocation and usage of hardware resources such as memory, processing time and peripheral devices in the client 103 and server 106. In this manner, the operating systems 143 and 173 serve as the foundation on which applications depend as is generally known by those with ordinary skill in the art.

Next, the operation of the attendance tracking network 100 is described. To begin, the instructor or professor of a class carries the portable identification capture device 123 into a classroom and the portable identification capture device 123 is passed around among the students before or during class to allow them to input their own personal identification data 153. In this manner, the professor identifies those students who are in attendance for a given class on a given day without taking the time to actually take attendance manually.

The portable identification capture device 123 may be any one of a number of devices. For example, the portable identification capture device 123 may be a magnetic card reader, a radio frequency identification (RFID) capture device, a biometric capture device, or other capture device as described above. In the case that the portable identification capture device 123 is a magnetic card reader, then each student would have a magnetic card such as a student ID that they would scan using the portable identification capture device 123 to input their personal identification data. Alternatively, in the case that the portable identification capture device 123 is an RFID capture device, the students would have RFID tags such a tag on a key chain that are scanned by the RFID capture device in order to input the personal identification data of the students that is embodied in the RFID tags. As an additional alternative, the portable identification capture device 123 may be biometric capture device that can input a fingerprint, retinal scan, or other biometric information.

Once the students have each input their personal identification data into the portable identification capture device 123, then the professor or instructor of the class can take the portable identification capture device 123 back to their office in order to upload the data stored in the portable identification capture device 123 to the server 106.

In order to do this, the professor establishes data communication between the portable identification capture device 123 and the client 103. This may be done, for example, by coupling the portable identification capture device 123 to the client 103. Alternatively, wireless communication between the portable identification capture device 123 and the client 103 may be established by placing the portable identification capture device 123 within a predefined distance of the client 103 as can be appreciated. The automatic upload application 146 senses that data communication has been established between the portable identification capture device 123 and the client 103. In response, the automatic upload application 146 generates a user interface 193 on the display device 113. The user interface 193 asks the user to enter a course name as well as the instructor or professor name associated with the course for which the personal identification data stored on the portable identification capture device 123 that is to be uploaded. Alternatively, the course name and the instructor or professor may be preprogrammed in the portable identification capture device 123, thereby eliminating the need to present the user interface 193 on the display device at all.

Once this information is entered in the user interface 193, then the user may manipulate an appropriate graphical component of the user interface 193 in order to initiate an execution of an automatic upload of the personal identification data from the portable identification capture device 123 to the server 106. Alternatively, where the user interface 193 is not generated as described above, the automatic upload application 146 may proceed to execute the automated upload of the personal identification data from the portable identification capture device 123 when data communication is detected as being established between the portable identification capture device 123 and the client 103. Thereafter, the automatic upload application 146 proceeds to upload the personal identification data from the portable identification capture device 123 into the memory 136 as the personal identification data 153.

Once the personal identification data 153 has successfully uploaded from the portable identification capture device 123 into the memory 136 of the client 103, then the automatic upload application 146 automatically transmits the personal identification data 153 from the client 103 to the server 106. The attendance tracking system 179 communicates with the automatic upload application 146 to receive the personal identification data 153 from the client 103. Once received, the attendance tracking system 179 then populates the personal identification data 153 into the database 183 as the attendance records 189 for the respective course 186. After the personal identification data 153 has been successfully uploaded to the server 106 and the attendance tracking system 179 successfully populates the database 183 with the personal identification data, then the attendance tracking system 179 send a message to the automatic upload application 146 that the upload and storage of the personal identification data was successful.

Thereafter, the automatic upload application 146 deletes the personal identification data 153 stored in the memory 136 or marks such data for deletion at some future time. Thus, the personal identification data 153 is stored in the memory 136 on a temporary basis so as to insure that such data was successfully transmitted to the server 106 and stored in the database 183. This is done so as to insure that no data is lost due to power outage or other anomaly as can be appreciated. In this respect, the portion of the memory 136 within which the personal identification data 153 is stored is a non-volatile portion of the memory 136, so that a power outage or other problem does not result in a loss of data.

In addition, where the attendance tracking system 179 is part of a course management system 176, then the automatic upload application 146 may include an upload plug-in 149 that facilitates communication with the respective course management system 176. In this respect, there may be several course management systems 176 in use by various universities or other organizations. For example, course management systems 176 that exist currently include BLACKBOARD, WEBCT, and MOODLE or other systems not mentioned herein.

In order to make the automatic uploaded application 146 compatible with a given course management system 176, an appropriate upload plug-in may be installed in the client 103 as a portion of the automatic upload application 146, where each upload plug-in 149 is compatible with a corresponding one of a plurality of course management systems 176. When the automatic upload application 146 is executed, the installed one of the plug-ins 149 is executed therewith and is configured to package the personal identification data harvested from the portable identification capture device 123 so as to be compatible with the corresponding one of the course management systems 176 executed on the server 106.

Once the personal identification data is stored in the database 183 as the attendance records 189, then the same may be analyzed for each of the courses 186 for each of the students to identify any of the students that have missed a predefined number of the class of a given course 186 before the course 186 is complete. For example, it may be the case that a given course 186 allows students no more than a maximum of three absences in order to get a "complete" grade for the course 186. As such, the attendance tracking system 179 may look through the attendance records 189 for the respective course and identify students that have missed one, two, or three classes. In response to these absences, one or more remedial actions may automatically be implemented in an attempt to improve the attendance to the course 186 that was missed by the student to reduce the probability that the student will fail the class.

For example, in the cited situation above where a student missed one or two classes, an electronic message such as an e-mail may be transmitted to the offending students to remind them of the maximum number of absences that are allowed for the class for a successful completion. Where two or three absences occur, then the electronic mail message might not only remind the student of the maximum number of allowed absences, but might also suggest the availability of student counseling services in an attempt to avoid future absences by the student.

In a situation where the student has missed three classes, for example, the attendance tracking system 179 might take further action by automatically scheduling a meeting between the offending student an adviser for that student. In addition, there may be many other remedial measures taken on an automated basis to try to ensure that the attendance by the student is not a problem that has an adverse effect on the student's grades.

In addition, other actions that may be taken in response to detected absences include automatically transmitting an electronic version of the subject matter that was presented into the class that was missed by a given student. In this respect, class subject matter that is presented in the form of a power point presentation or other type of presentation may be automatically e-mailed to the student in response to a detection that the student was absent for a given class. Alternatively, a video or audio recording of the class session may be made available in digital form to the students. In particular, such media files may be stored in the database 183 for attachment to electronic mail messages sent to the students that missed a given class for make-up purposes.

In these ways, a university or other institution can help increase the likelihood of student success for the given curriculum, thereby improving the stability of the student population of the university. Consequently, the mission of a university or other institution of imparting knowledge to the public is more readily achieved.

Figure 2:
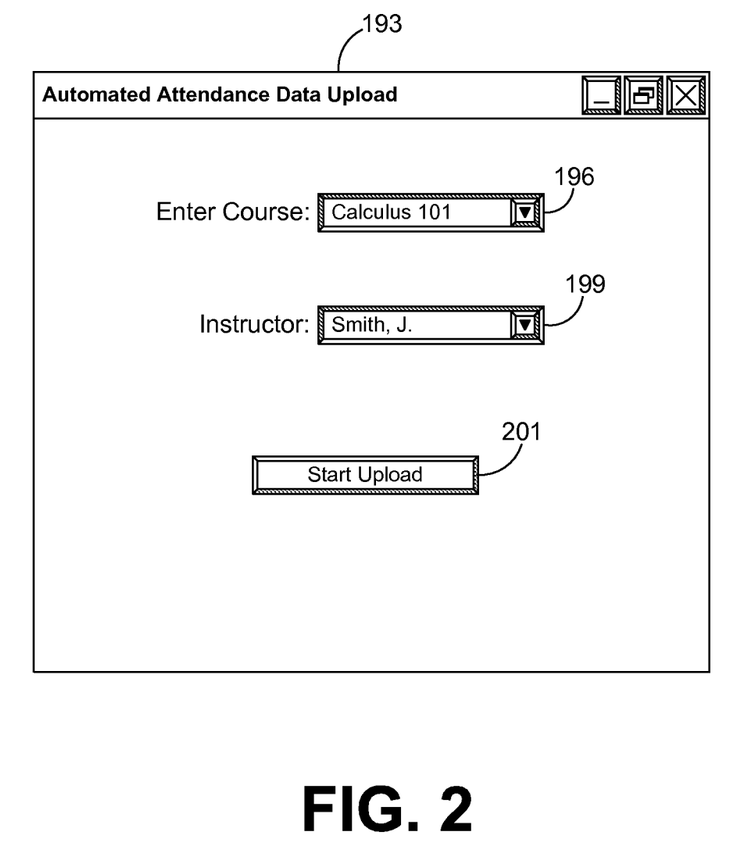
FIG. 2 is drawing of a graphical user interface generated on a client device in the network of FIG. 1 according to an embodiment of the present invention.

Referring next to FIG. 2, as shown is one example of the user interface 193 according to an embodiment of the present invention. As shown, the user interface 193 includes a course field 196, an instructor field 199, and an upload button 201. The course field 196 and the instructor field 199 allow a user to identify the particular course and instructor for which the upload of the personal identification data is to be stored. The upload button 201 is then manipulated once the appropriate course and instructor are entered in the course field 196 and the instructor field 199 so as to initiate the upload function as described above. To enter information and manipulate the various components of the user interface 193, a user may manipulate the buttons of the keyboard and may manipulate the mouse as can be appreciated. Alternatively, inputs may be received in some other manner such as, for example, via a microphone using voice recognition capabilities, etc.

Figure 3:
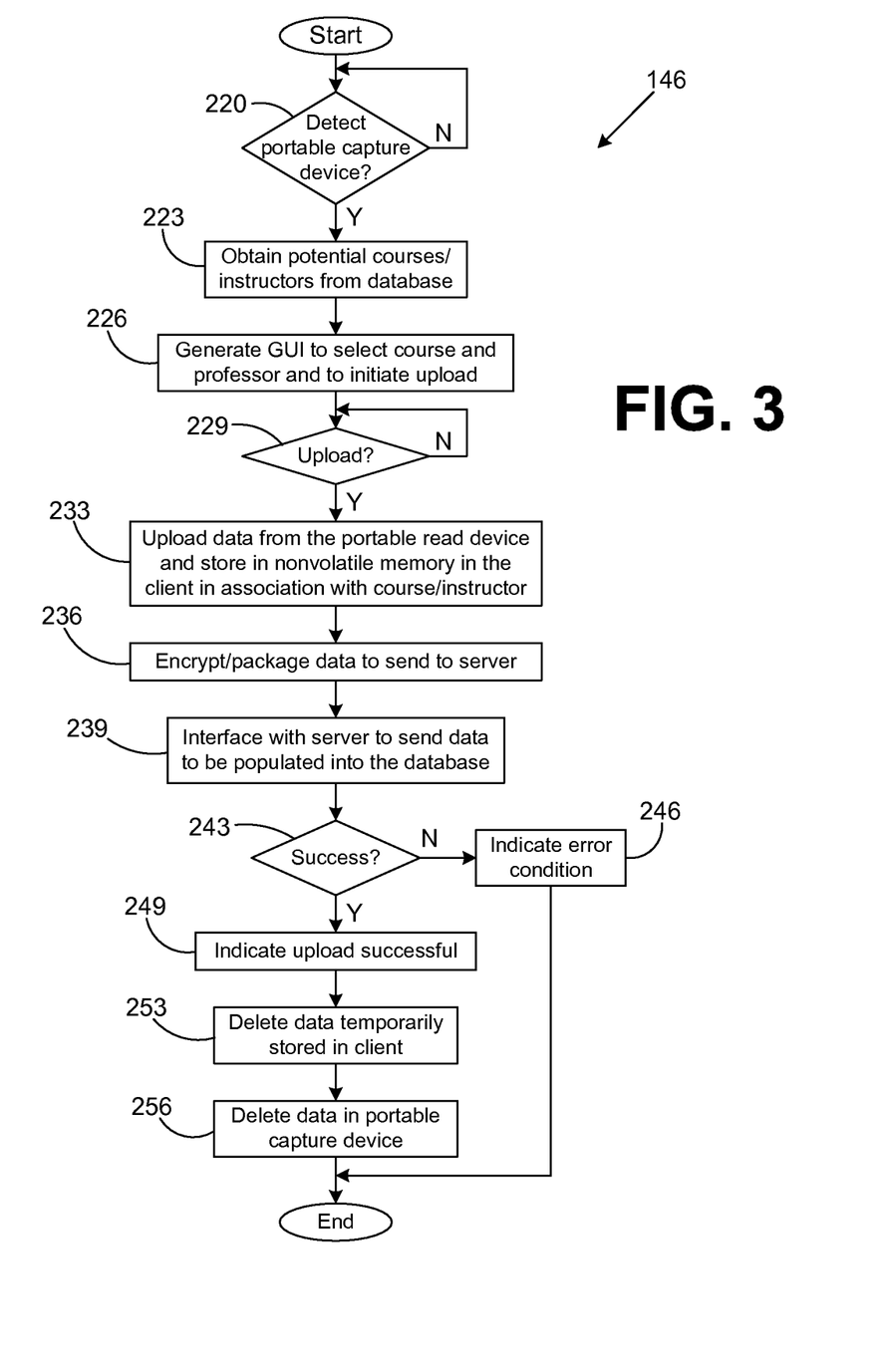
FIG. 3 is a flow chart of one example of an automated upload application executed on a client device in the network of FIG. 1 according to an embodiment of the present invention.

Referring next to FIG. 3, shown is a flow chart that provides one example of the operation of the automated upload application 146 according to an embodiment of the present invention. Alternatively, the flow chart of FIG. 3 may be viewed as depicting steps of an example of a method implemented in the client 103 to automatically upload the personal identification data 153 from the portable identification capture device 123 to the server 106. The functionality of the automated upload application 146 as depicted by the example flow chart of FIG. 3 may be implemented, for example, in an object oriented design or in some other programming architecture. Assuming the functionality is implemented in an object oriented design, then each block represents functionality that may be implemented in one or more methods that are encapsulated in one or more objects. The automated upload application 146 may be implemented using any one of a number of programming languages such as, for example, C, C++, or other programming languages.

Beginning with box 220, the automatic upload application 146 detects whether data communications has been established or initiated between the portable identification capture device 123 and the client 103. In this respect, the automatic upload application 146 detects whether it can communicate with the portable identification capture device 123 due to the fact that the portable identification capture device 123 has been physically coupled to the client 103 through an appropriate interface or due to an initiation of wireless communication there between. If not, then the automatic upload application 146 remains at box 220.

Assuming that data communication has been established or initiated between the portable identification upload device 123 and the client 103 in box 220, then the automatic upload application 146 proceeds to box 223 in which potential courses and instructors are obtained from a database so as to be presented in a pull-down list associated with the course field 196 and the instructor field 199 (FIG. 2). This is done so that an individual may select the respective course and instructor to be associated with the personal identification data that is to be uploaded to the server 106 (FIG. 1).

Next, in box 226, the automatic upload application 146 generates the user interface 193 (FIG. 2) on the display device 113 (FIG. 1) in order to allow the individual to specify both the course and the instructor/professor for the respective personal identification data to be uploaded, as well as to initiate the upload itself. Then, in box 229 it is determined whether the upload is to be initiated as can be determined by whether the user manipulates the upload button 201 (FIG. 2).

In an additional embodiment, the automatic upload application 146 proceeds directly from box 220 to box 233 when it is not necessary input the course name and instructor/professor, where such information may be preprogrammed in the portable identification capture device 123 and uploaded with the personal identification data. In this manner, the upload process is performed without any input from a user.

Assuming that the upload has been initiated, then in box 233 the personal identification data is read from the portable identification capture device 123 and onto the memory 136 (FIG. 1) of the client 103 (FIG. 1). In this respect, the personal identification data 153 is stored in a non-volatile portion of the memory 136. This data is stored in association with the course and instructor indicated by the user by the manipulation of the respective fields of the user interface 193 as described above. Thereafter, in box 236, the personal identification data is packaged and/or encrypted in order to be sent to the server 106. In this respect, the data is packaged according to a protocol that it is accepted by either the course management system 176 or the attendance tracking system 179 as is appropriate.

Next, in box 239, the automatic upload application 146 interfaces with the server 106 to send the packaged personal identification data to the server to be populated into the database 183. Then, in box 243, the automatic upload application 146 determines whether the upload to the server 106 was success. This may be determined, for example, by waiting to receive a confirmation message from the server 106 that the data was fully received and stored in the database 183.

Assuming that it is determined that the personal identification data was not successfully uploaded and stored in box 243, then the automatic upload application 146 proceeds to box 246 in which an error indication is rendered to the user on a display device 113 informing them of the situation. Thereafter, the automatic upload application 146 ends as shown. In such case, user may reinitiate the upload process. Alternatively, an additional user interfaces may be presented that allow for a re-try of the automatic upload process as described above.

Assuming that the upload process was successful in box 243, then in box 249 an indication is rendered on the display device 113 that informs the user that the upload was successful. Next, in box 253 the personal identification data stored temporarily in a non-volatile portion of the memory 136 of the client 103 is deleted so as not to maintain old data. Alternatively, such data may be marked for deletion at a later time to ensure that such data is retained for at least a specific period of time barring the loss of such data on the server 106. Then, in box 256, the automatic upload application 146 communicates with the portable identification capture device 123 in order to cause the portable identification capture device 123 to delete the personal identification data stored therein so that it may be used for the capture of new data for a subsequent class, where the portable identification capture device 123 may include a limited memory capacity. In an alternative embodiment, the memory capacity of the portable identification capture device 123 may not be so limited and might not be erased until the end of a course, etc. As such, the personal identification data stored thereon is time stamped so that attendance of students to multiple classes can be distinguished.

In addition, the flow chart of FIG. 3 provides one example embodiment of the automatic upload application 146. In this respect, the automatic upload application 146 may include functionality in addition to that above that is not described herein in detail. Also, the functions set forth in boxes 236 and 239 may be performed by an upload plug-in 149. Also, such a plug-in may perform other functions beyond those described herein as can be appreciated.

Figure 4:
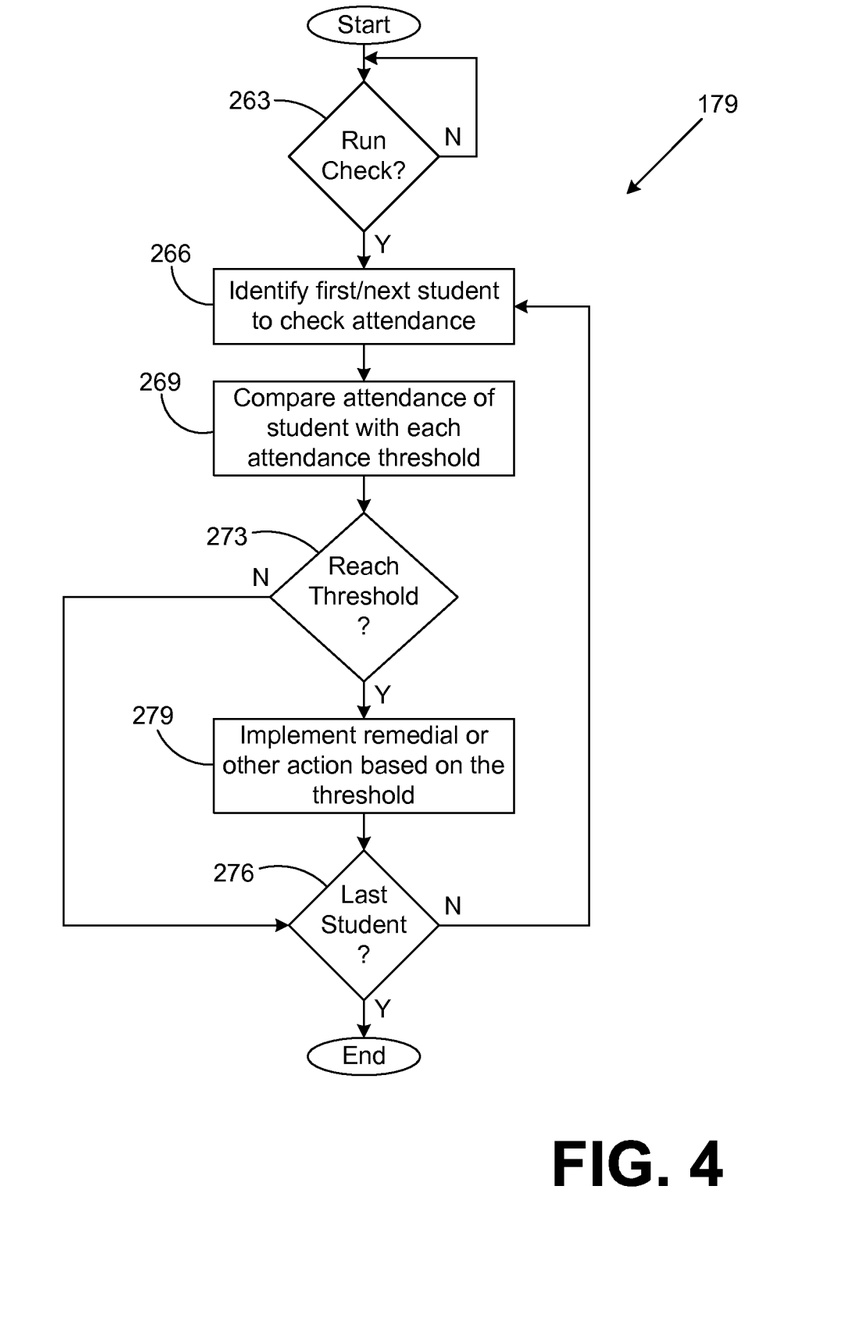
FIG. 4 is a flow chart of an example of a functionality of an attendance tracking system executed on a server of in the network of FIG. 1 according to an embodiment of the present invention.

Referring next to FIG. 4, shown is a flow chart that provides one example of various functionality of the attendance tracking system 179 according to an embodiment of the present invention. Alternatively, the flow chart of FIG. 4 may be viewed as depicting steps of an example of a method implemented in the server 106 to track the attendance of students to various courses and take remedial action in response to attendance problems. The functionality of the attendance tracking system 179 as depicted by the example flow chart of FIG. 4 may be implemented, for example, in an object oriented design or in some other programming architecture. Assuming the functionality is implemented in an object oriented design, then each block represents functionality that may be implemented in one or more methods that are encapsulated in one or more objects. The attendance tracking system 179 may be implemented using any one of a number of programming languages such as, for example, C, C++, or other programming languages.

Beginning with box 263, the attendance tracking system 179 determines whether it should run a check of the attendance for a given course or group of courses. Assuming that an attendance check is to be run, then in box 266, the attendance tracking system 179 identifies a first student for which attendance is to be checked for a given course. Thereafter, in box 269, the attendance of the student is checked in comparison with attendance thresholds associated with the course. In this respect, there may be many thresholds for a given course. Also, each course may have a unique group of thresholds for comparison for attendance.

For example, a given course may have a threshold of a first missed class that triggers one or more first remedial actions, a second missed class that triggers additional remedial actions, and a third missed class that triggers additional remedial actions.

Next, in box 273, it is determined whether an attendance threshold has been reached or surpassed for a respective student for a given course. In this respect, the attendance threshold reached may be any one of a number of thresholds associated with the course. If no threshold has been reached in box 273, than the attendance tracking system proceeds to box 276. Otherwise, the attendance tracking system 179 progresses to box 279 as shown. In box 276, it is determined whether the last student for the given course has been checked. If no, then the attendance tracking system 179 reverts back to box 266 to identify the next student for which attendance is to be checked.

Assuming that the attendance tracking system 179 has progressed to box 279, then the attendance tracking system 179 implements a corresponding remedial action, or other action based on the respective threshold. In this respect, for each attendance threshold associated with a given course, one or more remedial actions may be automatically implemented in the event that such a threshold is reached.

For example, a remedial action may comprise the sending attendance reminders via email, the sending of the presentations of what was covered in class via email as described above, the sending of suggestions via email to seek academic counseling, the automated scheduling of a meeting with an advisor, or other action. In addition, other action may be taken such as, for example, automatically dropping the student from the class, automatically instituting a grade demotion due to the lack of attendance, or automatically registering a failure as the grade for the class due to a lack of attendance.

Still other actions may be informing personnel of the university of a violation of a student visa, such as might be the case with foreign student who may have mandatory attendance requirements but fails to show up for class. Further action may comprise informing deans or other personnel of a given institution about academic probation violations due to a lack of attendance. All such functions to inform various entities or personnel about an attendance problem for a student may employ electronic mail or may communicate the attendance problem using some other approach.

After instituting a remedial action or other action in box 279, then the attendance tracking system 179 progresses to box 276 as shown. Assuming that the last student has been checked in box 276, then the attendance tracking system 179 ends as shown. Otherwise, the attendance tracking system 179 reverts back to box 266 to examine the attendance of a next one of the students.

Figure 5:
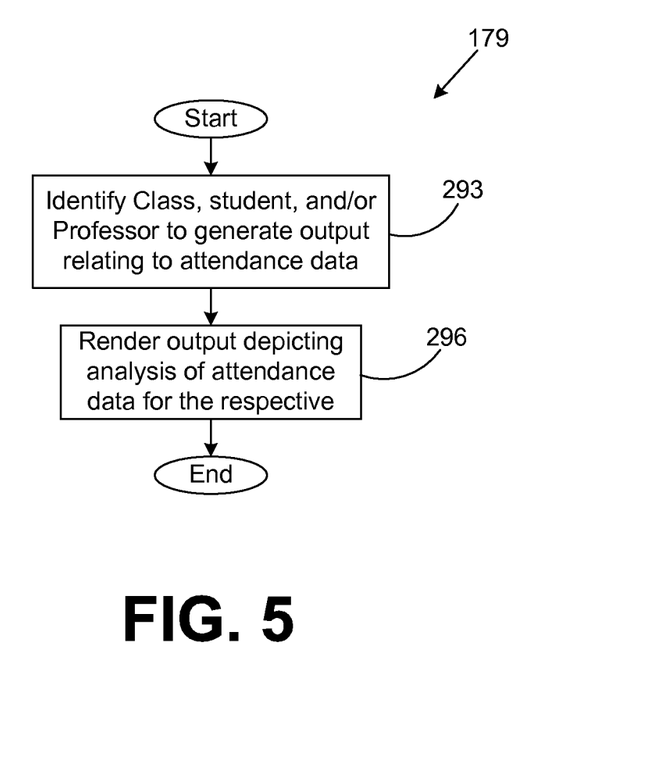
FIG. 5 is a flow chart of an example of a functionality of an output function of the attendance tracking system executed on a server of in the network of FIG. 1 according to an embodiment of the present invention.

Referring next to FIG. 5, shown is a flow chart that provides one example of additional functionality of the attendance tracking system 179 in accessing data from the database 183 (FIG. 1) according to an embodiment of the present invention. Alternatively, the flow chart of FIG. 5 may be viewed as depicting steps of an example of a method implemented in the server 106 to accessing data from the database 183 and generate an appropriate output. The functionality of the attendance tracking system 179 as depicted by the example flow chart of FIG. 5 may be implemented, for example, in an object oriented design or in some other programming architecture. Assuming the functionality is implemented in an object oriented design, then each block represents functionality that may be implemented in one or more methods that are encapsulated in one or more objects. The attendance tracking system 179 may be implemented using any one of a number of programming languages such as, for example, C, C++, or other programming languages.

Beginning with box 293, the attendance tracking system 179 identifies the class, student, and/or instructor for which output is to be generated relating to attendance data. In this respect, attendance data may be filtered based upon a given class or course, for a single student with respect to one or more classes, or with respect to a particular professor. Also, the attendance data may be filtered in some other manner. Thereafter, in box 296, an output depicting an analysis of the attendance data for the respective class, course, student, and/or instructor is rendered for review by a user. In this respect, such output may be rendered using an appropriate user interface depicted on the display device 113. Alternatively, such data may be printed using a printer, or such data may be rendered in some other manner as can be appreciated. Thereafter, the attendance tracking network 100 ends as shown.

The analysis that is output may be employed in any one of a number of ways. For example, the results of the analysis may be used to correlate attendance with student performance in a class. For example, where high attendance correlates with high performance in a given class, then such data may be presented to students as an incentive to attend class to achieve high marks. In addition, where such data indicates that attendance in a given class or course does not particularly correlate with academic performance, such data may indicate that the competency of the instructor or professor is in question. As such, the professor or instructor may themselves be subjected to instruction to improve their classroom and instruction skills. In addition, there may be other types of analysis performed on the data both during the conduction of the course itself as well as after the course or class is complete.

The various embodiments of the automatic upload application 146 and the attendance tracking system 179 of the present invention can be implemented in hardware, software, firmware, or a combination thereof. In the one embodiment, the automatic upload application 146 and the attendance tracking system 179 are implemented in software or firmware that is stored in a memory and that is executed by a suitable instruction execution system. If implemented in hardware, as in an alternative embodiment, the automatic upload application 146 and the attendance tracking system 179 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The flow charts of FIGS. 3-5 show the architecture, functionality, and operation of a possible implementation of the automatic upload application 146 and the attendance tracking system 179. In this regard, each block represents a module, segment, or portion of code, which comprises one or more executable instructions for implementing the specified logical function(s). It should also be noted that in some alternative implementations, the functions noted in the blocks may occur out of the order noted in FIGS. 3-5. For example, two blocks shown in succession in FIGS. 3-5 may in fact be executed substantially concurrently or the blocks may sometimes be executed in the reverse order, depending upon the functionality involved, as will be further clarified hereinbelow.

The automatic upload application 146 and the attendance tracking system 179 that each may comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. In addition, the scope of the certain embodiments of the present invention includes embodying the functionality of the embodiments of the present invention in logic embodied in hardware or software-configured mediums.

It should be emphasized that the above-described embodiments of the present invention, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A method for classroom attendance tracking, comprising:

harvesting personal identification data from each one of a plurality of students attending a class in conjunction with a conduct of the class using a portable identification capture device;

establishing data communication between the portable identification capture device and a client coupled to a server via a network; and automatically uploading the personal identification data from the portable identification capture device to the server;

wherein the step of automatically uploading the personal identification data from the portable identification capture device to the server further comprises the step of temporarily storing a copy of the personal identification data in a nonvolatile memory of the client while the personal identification data is being transmitted to the server until an indication is received that the personal identification data was successfully received in the server.

2. The method of claim 1, further comprising the step of making the personal identification data stored in the server accessible to the client.

3. The method of claim 1, wherein the step of automatically uploading the personal identification data from the portable identification capture device to the server further comprises the steps of:
   executing an application on the client that automatically detects that the portable identification capture device has been coupled to the client;
   automatically uploading the personal identification data from the portable identification capture device to the client; and
   automatically transmitting the personal identification data from the client to the server.

4. The method of claim 1, wherein the step of automatically uploading the personal identification data from the portable identification capture device to the server further comprises the steps of:
   installing one of a plurality of upload plug-ins in the client as a portion of the application, wherein each of the upload plug-ins is compatible with a corresponding one of a plurality of course management systems; and
   executing the one of the plug-ins in conjunction with the execution of the application, the one of the plug-ins being configured to package the personal identification data so as to be compatible with the corresponding one of the course management systems executed on the server.

5. A method, for classroom attendance tracking, comprising:
   harvesting personal identification data from each one of a plurality of students attending a class in conjunction with a conduct of the class using a portable identification capture device;
   establishing data communication between the portable identification capture device and a client coupled to a server via a network; and
   automatically uploading the personal identification data from the portable identification capture device to the server;
   wherein the step of automatically uploading the personal identification data from the portable identification capture device to the server further comprises the steps of:
      generating a graphical user interface with the application that facilitates an initiation of the automatic uploading of the personal identification data; and
      initiating the automatic uploading of the personal identification data upon a manipulation of a graphical component in the graphical user interface by a user.

6. The method of claim 5, wherein the class is one of a plurality of classes that comprise a course, the method further comprising the steps of:
   analyzing the personal identification data amassed for each of the classes of the course for each of the students to identify any of the students that have missed a predefined number of classes of the course before the course is complete; and
   implementing a remedial action in an attempt to improve the attendance to the course of the student that missed the predefined number of classes.

7. The method of claim 6, wherein the remedial action comprises automatically transmitting an electronic message to the students that have missed the predefined number of classes.

8. The method of claim 6, wherein the remedial action comprises automatically scheduling a meeting between each of the students that have missed the predefined number of classes and a corresponding advisor.

9. The method of claim 5, further comprising the steps of:
   analyzing the personal identification data amassed for each of the classes of the course for each of the students to identify any of the students that have missed the class; and
   automatically transmitting an electronic version of the subject matter presented in the class to each of the students that missed the class.

10. A system, comprising:
   a processor circuit in a client, the processor circuit having a processor and a memory;
   an automated upload system stored in the memory and executable by the processor, the automated upload system comprising:
      logic that detects an initiation of data communication between a portable identification capture device and the client, wherein personal identification data captured from each one of a plurality of students attending a class is stored on the portable identification capture device, the personal identification data having been captured in the portable identification capture device in conjunction with a conduct of the class; and
      logic that automatically uploads the personal identification data from the portable identification capture device to a server that is coupled to the client through a network.

11. The system of claim 10, wherein the personal identification data comprises biometric data.

12. The system of claim 10, wherein the portable identification capture device further comprises a card reader, and the personal identification data captured from each one of the students attending the class comprises personal data stored on a card held by each of the students.

13. The system of claim 10, wherein the portable identification capture device further comprises a radio frequency identification (RFID) reader, and the personal identification data captured from each one of the students attending the class comprises personal data stored on an RFID tag held by each of the students.

14. The system of claim 10, wherein the logic that automatically uploads the personal identification data from the portable identification capture device to the server that is coupled to the client through the network further comprises an upload plug-in that facilitates the automatic upload of the personal identification data by implementing a communication protocol with one of a plurality of course management systems executed on the server, wherein each of the course management systems requires a corresponding unique communication protocol.

15. A system in a client uploading data to a server from a portable identification capture device, comprising:
   means for detecting an initiation of data communication between the portable identification capture device and the client, wherein personal identification data captured from each one of a plurality of students attending a class is stored on the portable identification capture device, the personal identification data having been captured in the portable identification capture device in conjunction with a conduct of the class; and means for automatically uploading the personal identification data from the portable identification capture device to a server that is coupled to the client through a network.

16. The system of claim 15, wherein the means for automatically uploading the personal identification data from the portable identification capture device to the server that is coupled to the client through the network further comprises:

means for automatically uploading the personal identification data from the portable identification capture device to the client; and means for automatically transmitting the personal identification data from the client to the server.

17. The system of claim 15, wherein the means for automatically uploading the personal identification data from the portable identification capture device to the server that is coupled to the client through the network further comprises means for temporarily storing a copy of the personal identification data in a nonvolatile memory of the client while the personal identification data is being transmitted to the server until an indication is received that the personal identification data was successfully received in the server.

18. A computer program embodied in a non-transitory computer readable medium for execution in a client to upload data to a server from a portable identification capture device, comprising:

code that detects an initiation of data communication between the portable identification capture device and the client, wherein personal identification data captured from each one of a plurality of students attending a class is stored on the portable identification capture device, the personal identification data having been captured in the portable identification capture device in conjunction with a conduct of the class; and code that automatically uploads the personal identification data from the portable identification capture device to a server that is coupled to the client through a network.

19. The computer program embodied in the computer readable medium of claim 18, wherein the personal identification data further comprises a plurality of values that correspond with each of the students, respectively, wherein each of the values uniquely identifies one of the students relative to each other and provides proof that the respective student was personally present at the class to effect the capture of the value in the portable identification capture device.

20. A method for enhancing classroom attendance, comprising the steps of:

accumulating an attendance record in a database for each student of a course during the conduct of the course, where the course comprises a plurality of classes, and each of the attendance records comprising personal identification data captured in each of the classes from a respective one of the students;

analyzing the attendance record for each of the students taking the course to identify at least one of the students that have missed one of the classes of the course before the course is completed; and automatically transmitting an electronic version of the subject matter presented in the missed one of the classes of the course to the at least one of the students.

* * * * *